(12) United States Patent
Ido et al.

(10) Patent No.: US 12,297,973 B2
(45) Date of Patent: May 13, 2025

(54) LIGHTING APPARATUS, AND VEHICLE LAMP SYSTEM

(71) Applicant: STANLEY ELECTRIC CO., LTD., Tokyo (JP)

(72) Inventors: Hiroaki Ido, Tokyo (JP); Matsuo Kamei, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/722,136

(22) PCT Filed: Dec. 5, 2022

(86) PCT No.: PCT/JP2022/044672
§ 371 (c)(1),
(2) Date: Jun. 20, 2024

(87) PCT Pub. No.: WO2023/120128
PCT Pub. Date: Jun. 29, 2023

(65) Prior Publication Data
US 2025/0052396 A1 Feb. 13, 2025

(30) Foreign Application Priority Data
Dec. 21, 2021 (JP) .................... 2021-207432

(51) Int. Cl.
*F21S 41/135* (2018.01)
*F21S 41/147* (2018.01)
(Continued)

(52) U.S. Cl.
CPC ........... *F21S 41/645* (2018.01); *F21S 41/147* (2018.01); *F21S 41/25* (2018.01); *F21S 41/285* (2018.01); *F21S 41/36* (2018.01)

(58) Field of Classification Search
CPC ........ F21S 41/645; F21S 41/147; F21S 41/25; F21S 41/285
See application file for complete search history.

(56) References Cited

U.S. PATENT DOCUMENTS 5,612,797 A 3/1997 Clarke
2019/0226656 A1 7/2019 Toko et al.
(Continued)

FOREIGN PATENT DOCUMENTS

JP H09500982 A 1/1997
JP 2019128449 A 8/2019
(Continued)

OTHER PUBLICATIONS

International Search Report (ISR) (and English language translation thereof) dated Feb. 21, 2023, issued in International Application No. PCT/JP2022/044672.

(Continued)

*Primary Examiner* — Elmito Breval
(74) *Attorney, Agent, or Firm* — Holtz, Holtz & Volek PC

(57) ABSTRACT

A lighting apparatus includes a light source; a condensing part that condenses light and forms a focal point at a predetermined position; a liquid crystal element arranged at a position including the focal point; a first polarizing element; a second polarizing element; and a projection lens that projects images generated by the liquid crystal element and the polarizing elements; where the liquid crystal element has a first surface which includes the focal point position and is perpendicular to the projection lens optical axis, and a second surface disposed around the first surface and is oblique to the projection lens optical axis; and where the second surface is arranged such that the light is incident on the liquid crystal layer of the liquid crystal element from a best viewing azimuth of the liquid crystal element.

8 Claims, 9 Drawing Sheets

(51) Int. Cl.
*F21S 41/20* (2018.01)
*F21S 41/25* (2018.01)
*F21S 41/36* (2018.01)
*F21S 41/64* (2018.01)

(56) References Cited

U.S. PATENT DOCUMENTS

2019/0264887 A1 8/2019 Albou
2019/0271448 A1* 9/2019 Kogure ................ F21S 41/135
2020/0209602 A1* 7/2020 Pau ...................... G01M 11/331

FOREIGN PATENT DOCUMENTS

JP 2021096996 A 6/2021
JP 2021150182 A 9/2021

OTHER PUBLICATIONS

Written Opinion dated Feb. 21, 2023, issued in International Application No. PCT/JP2022/044672.

* cited by examiner

LIGHTING APPARATUS, AND VEHICLE LAMP SYSTEM

TECHNICAL FIELD

The present disclosure relates to a lighting apparatus, and a vehicle lamp system.

BACKGROUND ART

Japanese Unexamined Patent Application Publication No. 2019-128449A (Patent Document 1) describes a variable light distribution headlamp as an example of a lighting device that uses a vertically aligned liquid crystal element. However, there is room for improvement in terms of improving the brightness of the irradiation light emitted from the lighting device.

PRIOR ART DOCUMENT

Patent Document

[Patent Document 1] Japanese Unexamined Patent Application Publication No. 2019-128449A

SUMMARY OF THE INVENTION

Technical Problem

In a specific aspect, it is an object of the present disclosure to improve the brightness of irradiation light in a lighting apparatus or the like that uses a liquid crystal element.

Solution to the Problem (1) A lighting apparatus according to one aspect of the present disclosure is a lighting apparatus including: (a) a light source; (b) a condensing part that condenses light emitted from the light source so as to form a focal point at a predetermined position; (c) a liquid crystal element having a liquid crystal layer and arranged in correspondence with a position of the focal point; (d) a first polarizing element disposed on a light incident surface side of the liquid crystal element; (e) a second polarizing element disposed on a light emitting surface side of the liquid crystal element; and (f) a projection lens that magnifies and projects images generated by the liquid crystal element, the first polarizing element, and the second polarizing element; (g) where the liquid crystal element has a first surface that includes the position of the focal point and is substantially perpendicular to the optical axis of the projection lens, and at least one second surface disposed around the first surface and arranged in a direction oblique to the optical axis of the projection lens; and where the second surface is arranged such that the light is incident on the liquid crystal layer of the liquid crystal element from a best viewing azimuth of the liquid crystal element or from an azimuth within a range of ±90° or less in the azimuth angle direction based on the best viewing azimuth.

(2) A vehicle lamp system according to one aspect of the present disclosure is a vehicle lamp system that includes the lighting apparatus according to the above-described (1) and a controller that is connected to the lighting apparatus and performs operation control.

According to the above configurations, it is possible to improve the brightness of irradiation light in a lighting apparatus or the like that uses a liquid crystal element.

MODE FOR CARRYING OUT THE INVENTION

Figure 1A:
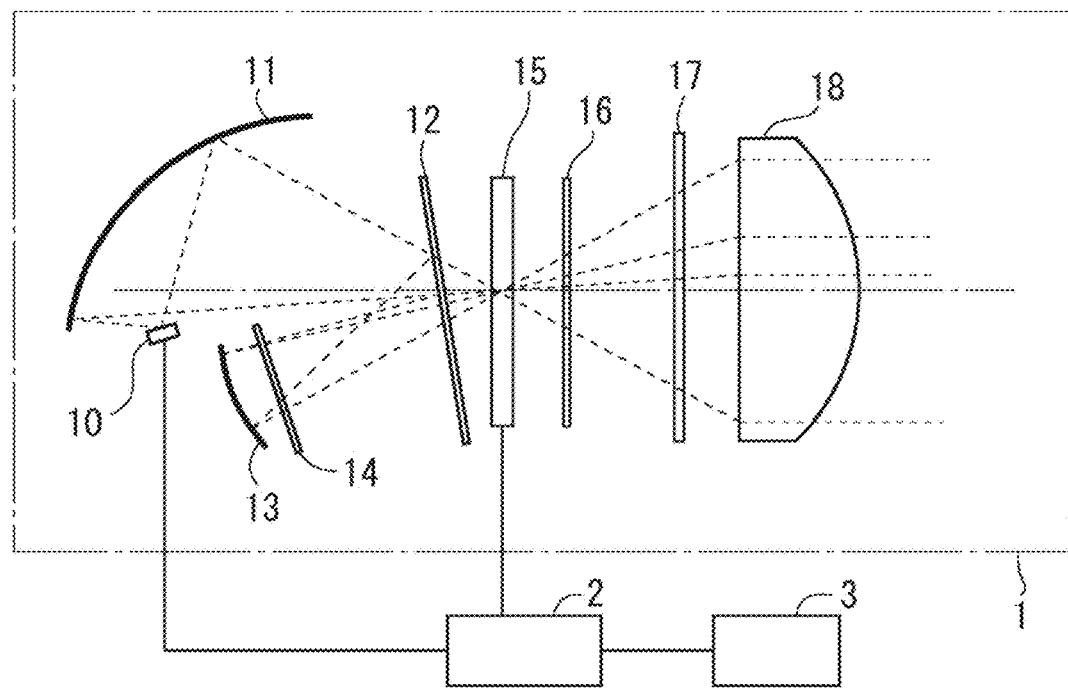
FIG. 1 is a diagram showing a configuration of a vehicle lamp system according to one embodiment.

FIG. 1A is a diagram showing a configuration of a vehicle lamp system according to one embodiment. The vehicle lamp system shown in FIG. 1A is configured to include a vehicle lamp (a lamp unit) 1, a controller 2, and a camera 3. This vehicle lamp system detects positions of vehicles in front, faces of pedestrians or the like around the own vehicle based on images taken by the camera 3, sets a certain region including the position of the vehicles in front as a non-irradiation region (a dimming region) and sets the other region as a light irradiation region and selectively irradiates light, and further irradiates light in various shapes onto the road surface.

The vehicle lamp 1 is arranged at a predetermined position at the front of the vehicle and forms irradiation light for illuminating the front of the vehicle. Here, although one vehicle lamp 1 is provided on each of the left and right sides of the front portion of the vehicle, only one lamp is illustrated here.

The controller 2 controls the operation of a light source 10 and a liquid crystal element 15 of the vehicle lamp 1. This controller 2 is realized by using a computer system having, for example, a CPU (Central Processing Unit), a ROM (Read Only Memory), a RAM (Random Access Memory), etc., and by executing a predetermined operating program in the computer system. The controller 2 of the present embodiment turns on the light source 10 according to the operating state of a light switch (not shown) installed near a driver's seat, sets a light distribution pattern according to objects such as a forward vehicle (oncoming vehicle, preceding vehicle), a pedestrian, a road sign, a white line on the road, or the like detected by the camera 3, and provides a control signal to the liquid crystal element 15 for forming an image corresponding to this light distribution pattern.

The camera 3 photographs the space in front of the own vehicle to generate an image and performs predetermined image recognition processing on this image to detect the position, range, size, type, etc. of the object such as the forward vehicle. The detection result obtained by the image recognition processing is provided to the controller 2 which is connected to the camera 3. The camera 3 is installed at a predetermined position inside the vehicle (for example, upper portion of the windshield) or at a predetermined position outside the vehicle (for example, inside the front bumper). If the vehicle is equipped with a camera for other purposes (for example, an automatic braking system, etc.), the camera may be shared.

Here, note that the function of image recognition processing of the camera 3 may be replaced by the controller 2. In this case, the camera 3 outputs the generated image to the controller 2, and image recognition processing is performed on the controller 2 side based on this image. Alternatively, both the image and the result of image recognition processing based on the image may be provided from the camera 3 to the controller 2. In this case, the controller 2 may further perform its own image recognition processing using the image obtained from the camera 3.

The vehicle lamp 1 shown in FIG. 1A is configured to include the light source 10, reflectors (reflecting members) 11 and 13, a polarizing beam splitter 12, a ¼-wavelength plate 14, the liquid crystal element 15, an optical compensator 16, a polarizer 17, and a projection lens 18. Each of these elements is housed and integrated in one housing (case body), for example. Further, the light source 10 and the liquid crystal element 15 are each connected to the controller 2. Here, in the present embodiment, note that the polarizing beam splitter 12 corresponds to a "first polarizing element" and the polarizer 17 corresponds to a "second polarizing element".

The light source 10 emits light under the control of the controller 2. The light source 10 is configured to include several light emitting elements such as white LEDs (Light Emitting Diodes) and a drive circuit, for example. Here, note that the configuration of the light source 10 is not limited thereto. For example, the light source 10 can be a laser element, or a light source commonly used in a vehicle lamp such as a light bulb or a discharge lamp.

The reflector 11 is arranged in correspondence with the light source 10, reflects and condenses light emitted from the light source 10 so as to form a focal point at a predetermined position, guides it toward the polarizing beam splitter 12, and causes the light to enter the liquid crystal element 15. The reflector 11 is a reflecting mirror having an ellipsoidal reflecting surface, for example. In this case, the light source 10 can be placed near the focal point of the reflective surface of the reflector 11. Here, instead of the reflector 11, a condensing lens may be used as a condensing part.

The polarizing beam splitter 12 is a transmission-reflection type polarizing element that transmits a polarized light of a specific direction of the incident light and reflects a polarized light of the direction perpendicular to the specific direction and is arranged on the light incident surface side of the liquid crystal element 15. As such a polarizing beam splitter 12, for example, a wire grid type polarizing element, a multilayer film polarizing element, or the like can be used.

The reflector 13 is provided at a position where the light reflected by the polarizing beam splitter 12 can be incident, and reflects the incident light toward the direction of the polarizing beam splitter 12.

Figure 1B:
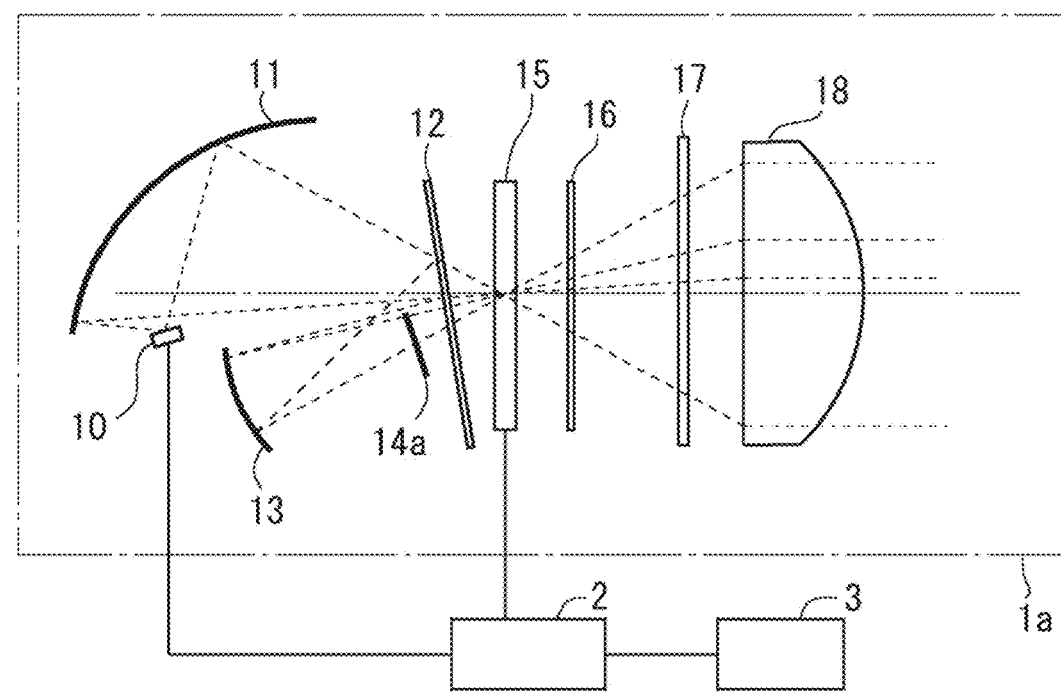

The ¼-wavelength plate 14 is placed on the optical path between the polarizing beam splitter 12 and the reflector 13 and provides a phase difference to the incident light. In the present embodiment, the light reflected by the polarizing beam splitter 12 passes through the ¼-wavelength plate 14, is reflected by the reflector 13 and passes through the ¼-wavelength plate 14 again, thereby the polarization direction is rotated by 90 degrees and the light enters the polarization beam splitter 12 again. As a result, the re-entering light becomes more easily transmitted through the polarizing beam splitter 12, so that the light utilization efficiency is improved. Here, note that instead of the ¼-wavelength plate 14, as shown in a vehicle lamp 1a of a modified working embodiment shown in FIG. 1B, a configuration may be adopted in which a ½-wavelength plate 14a is arranged at a position where the reflected light from the polarizing beam splitter 12 does not enter but the reflected light from the reflector 13 does enter.

The liquid crystal element 15 is arranged at a position that includes the focal point of the light reflected and condensed by each of the reflectors 11 and 13, and is arranged so that the light is incident thereon. The liquid crystal element 15 includes a plurality of pixel parts (light modulation parts) which can be controlled independently of each other. In the present embodiment, the liquid crystal element 15 includes a driver (not shown) for applying a driving voltage to each pixel parts. The driver applies a driving voltage to the liquid crystal element 15 to individually drive each pixel parts based on a control signal provided from the controller 2. As shown in the figure, the light incident on the liquid crystal element 15 is incident on the light incident surface of the liquid crystal element 15 at a wide angle. Specifically, the light is incident at a wide angle of about 40° to 60° with respect to the normal direction of the light incident surface.

The optical compensator 16 is for compensating phase difference of the light transmitted through the liquid crystal element 15 and is for increasing the degree of polarization, and is arranged on the light emitting surface side of the liquid crystal element 15. Specifically, the phase difference of the optical compensator 16 is set so that the sum of the phase difference of the optical compensator and the phase difference of the liquid crystal layer 15 becomes 0 or a value close to zero. Here, note that the optical compensator 16 may be omitted.

The polarizer 17 is arranged on the light emitting surface side of the liquid crystal element 15. The polarizing beam splitter 12, the polarizer 17, and the liquid crystal element 15 disposed therebetween form an image corresponding to a light distribution pattern of the light irradiated to the front of the own vehicle.

The projection lens 18 is arranged at a position where the light reflected and condensed by the reflectors 11 and 13 and transmitted through the liquid crystal element 15 can enter, and projects this incident light to the front of the own vehicle. The projection lens 18 is arranged so that its focal point corresponds to the position of the liquid crystal layer of the liquid crystal element 15. The optical axis of the projection lens 18 is along the left-right direction in the figure, as shown by a dashed line in the figure.

Figure 2A:
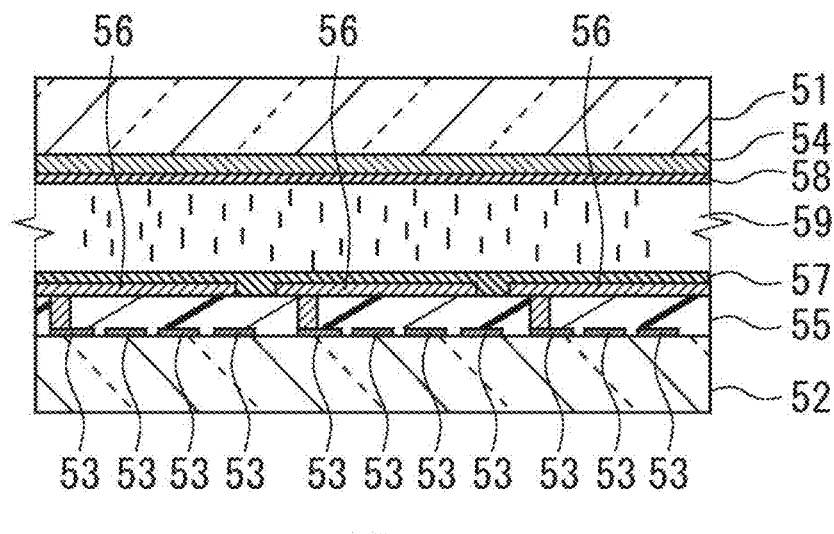
FIG. 2A is a schematic cross-sectional view showing a configuration example of a liquid crystal element.

FIG. 2A is a schematic cross-sectional view showing a configuration example of a liquid crystal element. Here, a segment display type liquid crystal element is exemplified. Specifically, the illustrated liquid crystal element 15 is configured to include a first substrate 51 and a second substrate 52 arranged to face each other, a plurality of wiring parts 53, a common electrode (counter electrode) 54, an insulation layer (insulation film) 55, a plurality of pixel electrodes 56, alignment films 57 and 58, and a liquid crystal layer 59.

The first substrate 51 and the second substrate 52 are each rectangular substrates in a plane view and are arranged to face each other, for example. As each substrate, a transparent substrate such as a glass substrate or a plastic substrate can be used, for example. Between the first substrate 51 and the second substrate 52, spherical spacers (not shown) made of resin film are distributed, for example, and a gap between the substrates is maintained at a desired size (for example, on the order of several μm) by these spherical spacers. Here, note that instead of the spherical spacers, columnar bodies made of resin or the like may be provided on the first substrate 51 side or the second substrate 52 side and used as spacers. In the present embodiment, it is assumed that the respective substrates are arranged such that the first substrate 51 faces the polarizer 17 and the second substrate 52 faces the polarizing beam splitter 12. That is, it is assumed that the respective substrates are arranged such that the first substrate 51 side is the light emitting side of the liquid crystal element 15 and the second substrate 52 side is the light incident side of the liquid crystal element 15.

The plurality of wiring parts 53 are provided on the lower layer side of the insulation layer 55 on one surface side of the second substrate 52. These wiring parts 53 are formed by appropriately patterning a transparent conductive film such as indium tin oxide (ITO). Each wiring parts 53 is for applying a voltage to each pixel electrode 56 from the driver.

The common electrode 54 is provided on one surface side of the first substrate 51. This common electrode 54 is integrally provided so as to face each pixel electrode 56 of the second substrate 52. The common electrode 54 is formed by appropriately patterning a transparent conductive film such as indium tin oxide (ITO).

The insulation layer 55 is provided on one surface side of the second substrate 52 above each wiring part 53 so as to cover them. In the present embodiment, the insulation layer 55 is provided so as to cover substantially the entire surface side of the second substrate 52. This insulation layer 55 is a $SiO_2$ film or a SiON film, for example, and can be formed by a gas phase process such as sputtering or a solution process. Here, note that an organic insulation film may be used as the insulation layer 55. The thickness of the insulation layer 55 is about 1 μm, for example.

The plurality of pixel electrodes 56 are provided above the insulation layer 55 on one surface side of the second substrate 52. These pixel electrodes 56 are formed by appropriately patterning a transparent conductive film such as indium tin oxide (ITO). In the present embodiment, a pixel part is configured at a portion where each pixel electrode 56 and the common electrode 54 face each other.

Each pixel electrode 56 is physically and electrically connected to one of the wiring parts 53 via a through hole provided in the insulation layer 55. In this way, by providing each pixel electrode 56 and each wiring part 53 on different layers, since there is no need to provide wiring between the pixel electrodes 56, the gap between the pixel electrodes 56 can be reduced, thereby the aperture ratio can be improved, and the amount of transmitted light can be increased. Further, the degree of layout freedom of each wiring part 53 is also enhanced.

The alignment film 57 is disposed on one surface side of the first substrate 51 above each pixel electrode 56 so as to cover them. The alignment film 58 is disposed on one surface side of the second substrate 52 on the upper side of the common electrode 54 so as to cover it. These alignment films 57 and 58 are for regulating the alignment state of the liquid crystal layer 59. Each of the alignment films 57 and 58 is subjected to a uniaxial alignment process such as a rubbing process, and has a uniaxial alignment regulating force that regulates the alignment of liquid crystal molecules in the liquid crystal layer 59 along its direction. The directions of the alignment treatment on each of the alignment films 57 and 58 are set to be alternate (anti-parallel), for example. The pretilt angle near the interface between each of the alignment films 57 and 58 and the liquid crystal layer 59 is about 89°, for example.

The liquid crystal layer 59 is provided between the first substrate 51 and the second substrate 52. The liquid crystal layer 59 is formed using a nematic liquid crystal material having fluidity, for example. In the present embodiment, the liquid crystal layer 59 is configured using a liquid crystal material having negative dielectric anisotropy and is added with a left-twisting chiral material. The amount of added chiral material can be set so that $d/p=0.31$, for example. Here, "d" is the layer thickness of the liquid crystal layer 59, and "p" is chiral pitch. The thickness of the liquid crystal layer 59 can be about 4 μm, for example.

Here, note that there are no particular limitations on the internal structure or driving method of the liquid crystal element 15 as long as it can freely modulate transmitted light to form a desired image. For example, in the above configuration example, the wiring and the pixel electrode are formed in different layers, but the layout is not limited thereto, and they may be formed within the same layer. Further, as the liquid crystal element 15, an active matrix type liquid crystal element configured by associating a thin film transistor to each pixel can be used, or a simple matrix type liquid crystal element in which multiple striped transparent electrodes are arranged facing each other and each region where the transparent electrodes overlap serves as a pixel part can be used. Furthermore, as the liquid crystal element 15, a segment display type liquid crystal element having a plurality of arbitrarily shaped pixel electrodes provided on one substrate and one (or more) counter electrodes provided on the other substrate can be used, and as for the driving method in this case, multiplex driving or static driving can be used.

Figure 2B:
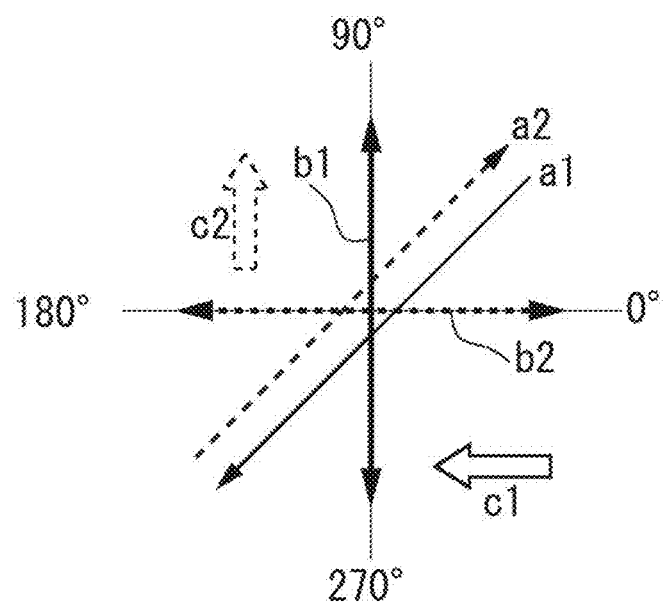
FIG. 2B is a diagram for explaining the direction of uniaxial alignment treatment to each alignment film.

FIG. 2B is a diagram for explaining the direction of uniaxial alignment treatment to each alignment film. Here, the direction of the uniaxial alignment process to each alignment film is shown when the liquid crystal element 15 is viewed in a plane view from the first substrate 11 side. As shown in the figure, assume that the transmission axis "b1" of the polarizer 17 on the front side (light emitting side) is arranged at 90°-270° azimuth, and the transmission axis "b2" of the polarizing beam splitter 12 on the back side (light incident side) is arranged at 0°-180° azimuth, for example. Then, direction "a1" of the uniaxial alignment process on the alignment film 57 of the first substrate 51 corresponding to the front side is set to 225° azimuth, and direction "a2" of the uniaxial alignment process on the alignment film 58 of the second substrate 52 corresponding to the back side is set to 45° azimuth. That is, directions "a1" and "a2" of each uniaxial alignment process are arranged so as to form an angle of 45° with respect to each transmission axis "b1" and "b2". Here, note that, in practice, since the relative angle may differ due to positional deviations or the like during manufacturing, etc., the relative angle of directions "a1" and "a2" of the uniaxial alignment process with respect to the respective transmission axes "b1" and "b2" are allowed to be within a range of about 45°±5°, for example.

The alignment film 57 of the first substrate 51 has a uniaxial alignment regulating force along direction "a1" in an initial state where no voltage is applied to the liquid crystal layer 59, and the alignment film 58 of the second substrate 52 has a uniaxial alignment regulating force along direction "a2" in an initial state where no voltage is applied to the liquid crystal layer 59. As a result, the initial alignment of the liquid crystal layer 59 becomes a uniformly aligned (monodomain alignment) state under the uniaxial alignment regulating force by each of the alignment films 57 and 58. Further, when a voltage is applied to the liquid crystal layer 59, the alignment direction of the liquid crystal molecules changes in a direction that approaches a horizontal state with respect to the substrate surface of each substrate 51, 52, and exhibits twisted alignment under the influence of the chiral material. For example, when a voltage that is 2.5 times or more of a threshold voltage of the liquid crystal material is applied to the liquid crystal layer 59, near the interface between the first substrate 51 and the liquid crystal layer 59 which corresponds to the front side, the substantial alignment direction of the liquid crystal molecules becomes 180° azimuth (direction "c1" in the figure), and near the interface between the second substrate 52 and the liquid crystal layer 59 which corresponds to the back side, the substantial alignment direction of the liquid crystal molecules becomes 90° azimuth (direction "c2" in the figure).

Figure 3A:
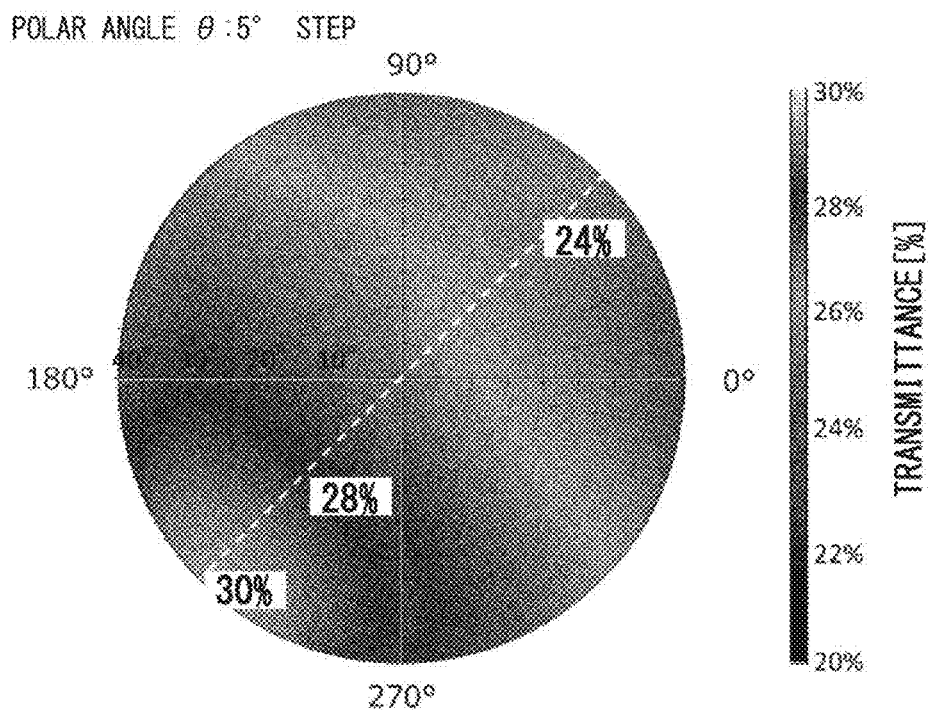
FIG. 3A is a diagram showing a measurement example of transmittance characteristics of a liquid crystal element.
Figure 3B:
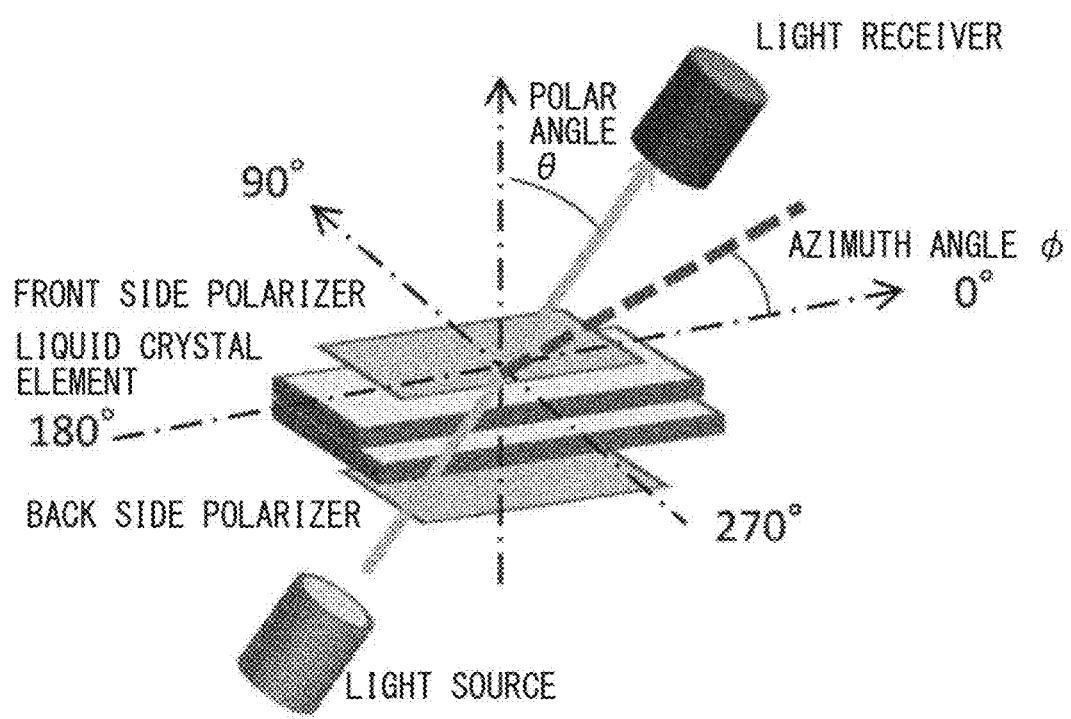
FIG. 3B is a diagram for explaining the arrangement of a measurement system in transmittance measurement.

FIG. 3A is a diagram showing a measurement example of transmittance characteristics of a liquid crystal element. Further, FIG. 3B is a diagram for explaining the arrangement of a measurement system in transmittance measurement. As shown in FIG. 3B, a polar angle θ is defined on the bases of an axis substantially perpendicular to each substrate surface of the liquid crystal element, and an azimuth angle φ is defined on the bases of an axis substantially horizontal to each substrate surface of the liquid crystal element. The relative arrangement relationship between the liquid crystal element and each polarizer (front side polarizer, back side polarizer) is as shown in FIG. 2B. This measurement system is configured such that light from a light source passes through a liquid crystal element and is received by a light receiver, and the polar angle θ and the azimuth angle φ at this time can be variably set.

In FIG. 3A, with regard to the polar angle θ, the axis is set concentrically, the center of the circle corresponds to polar angle θ=0, and the outermost circumference corresponds to polar angle θ=40°. Further, with regard to the azimuth angle φ, the horizontal direction in the figure corresponds to 0°-180°, and the vertical direction in the figure corresponds to 90°-270°. Further, this measurement example shows a case where a sufficiently high voltage which is 2.5 times or more of the threshold voltage (for example, 12 V) is applied to the liquid crystal layer 59 of the liquid crystal element 15. As shown in the figure, the best viewing azimuth is φ=225° azimuth (azimuth of time 7:30), and as a specific numerical example of the transmittance in this direction is shown in the figure, the transmittance tends to increase as the polar angle θ increases. Further, the transmittance is relatively high at two azimuths which are perpendicular to the best viewing azimuth, but the transmittance is relatively low at the anti-viewing direction (φ=45° azimuth), which is the azimuth 180 degrees different from the best viewing azimuth. This is because, when a voltage is applied to the liquid crystal layer 59, monodomain alignment which is a state where liquid crystal molecules are aligned obliquely in one direction occurs. That is, on the basis of the best viewing azimuth, the transmittance increases relatively within a range of ±90° (range of 135° or more and 315° or less) from the best viewing azimuth, and conversely, on the basis of the anti-viewing azimuth, the transmittance decreases relatively in a range of less than ±90° (a range greater than 315° up to 0° and a range from 0° to less than 135°) from the anti-viewing azimuth. Here, note that this tendency is the same even when the above-described polarizing beam splitter 12 is used as a polarizing element, and it is also the same when a transmission-reflection type polarizer with an optical multilayer film is used. From the above study, a knowledge is gained such that, by arranging the liquid crystal element 15 (specifically, the liquid crystal layer 59) so as to be tilted in correspondence with the best viewing azimuth or a azimuth in a range of ±90° or less (more preferably within a range of ±45° from the best viewing azimuth), maximum luminous intensity of the irradiation light from the vehicle lamp 1 can be increased by utilizing the transmittance when the above-described polar angle θ is increased.

Figure 4A:
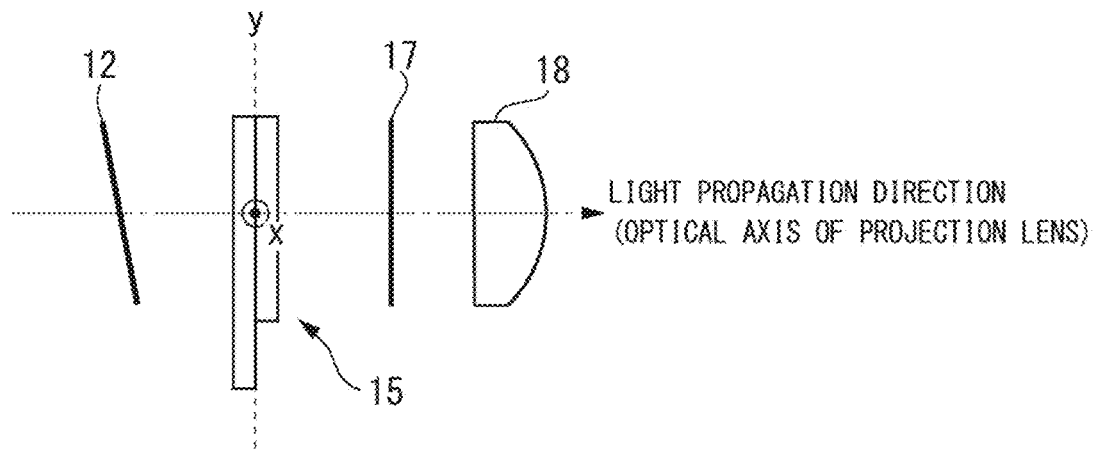
FIG. 4A is a diagram showing a configuration in which a liquid crystal element is arranged without being tilted.

FIG. 4A is a diagram showing a configuration (a base configuration) in which a liquid crystal element is arranged without being tilted. Here, in order to facilitate ease of understanding, main components of the liquid crystal element 15, namely, the polarizing beam splitter 12, the polarizer 17, and the projection lens 18 are shown. Further, light propagation direction illustrated in the figure is the propagation direction of light incident on the liquid crystal element 15 in FIG. 1A or FIG. 1B. Specifically, it is an axis that is horizontal in the left-right direction in FIG. 1A or FIG. 1B and that passes through the liquid crystal element 15. Further, the light propagation direction is parallel to the optical axis of the projection lens 18. The optical axis of the projection lens 18 here is a virtual straight line passing through the center and the focal point of the projection lens 18.

On the basis of the arrangement shown in FIG. 4A, x-axis is defined as an axis that is parallel to each substrate of the liquid crystal element 15 and parallel to the left-right direction of the liquid crystal element 15 (direction perpendicular to the plane of the paper surface) and y-axis is defined as the axis that is parallel to each substrate of the liquid crystal element 15 and along the vertical direction (the vertical direction of the paper surface) of the liquid crystal element 15. Both the x-axis and the y-axis are axes that intersect the light propagation direction. In the present embodiment, the x-axis corresponds to the 0°-180° direction shown in FIG. 2B described above, and the y-axis corresponds to the 90°-270° direction shown in FIG. 2B described above. Further, in the arrangement shown in FIG. 4A, the x-axis corresponds to the left-right direction of the vehicle lamp 1 and the y-axis corresponds to the vertical direction of the vehicle lamp 1. In the state shown in FIG. 4A, the rotation angle of the liquid crystal element 15 on the x-axis and the rotation angle on the y-axis are both 0°. Further, the alignment direction of the liquid crystal molecules approximately at the center in the layer thickness direction in the liquid crystal layer 59 of the liquid crystal element 15 is set at 45° azimuth of FIG. 3B. This is a direction that forms an angle of 45° with respect to each of the x-axis and y-axis in the figure.

Figure 4B:
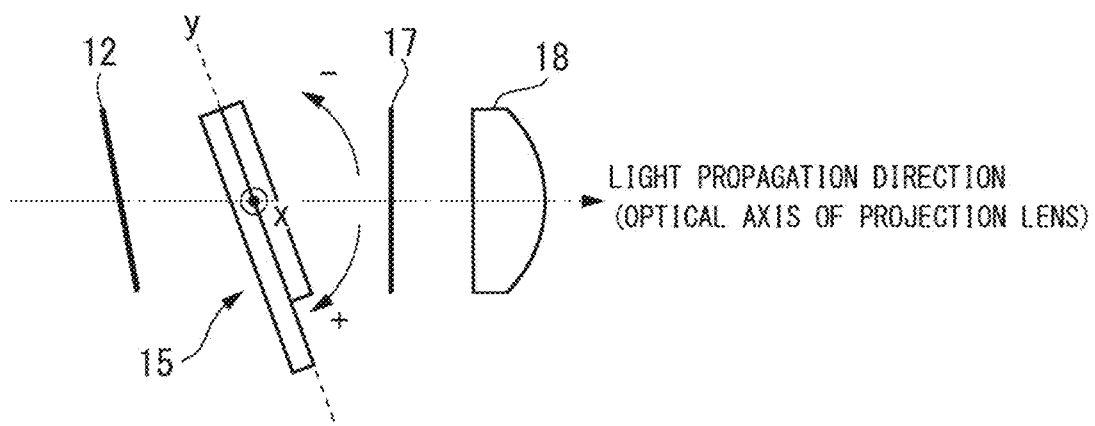
FIG. 4B and FIG. 4C are each a diagram showing a configuration example in which the liquid crystal element is arranged being tilted.
Figure 4C:
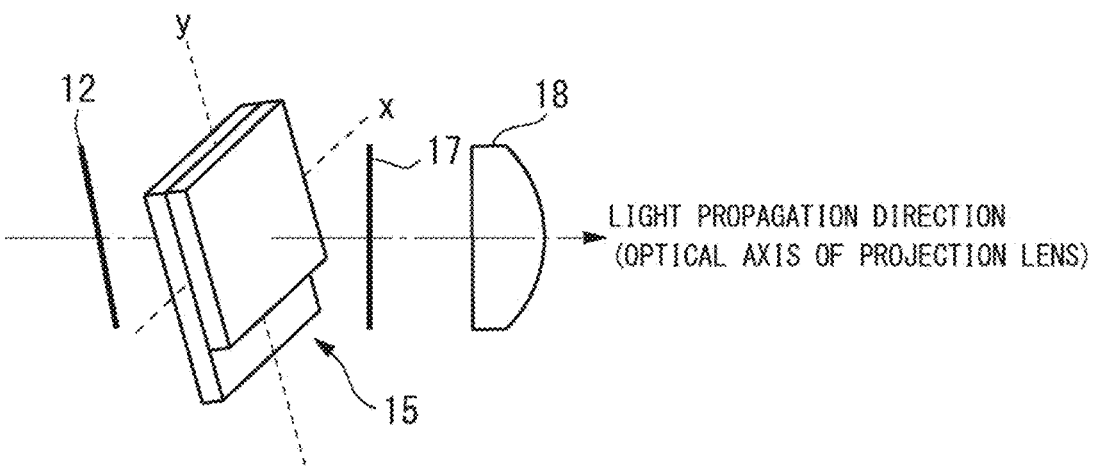

FIG. 4B is a diagram showing a configuration example in which the liquid crystal element is arranged being tilted. In the illustrated example, the liquid crystal element 15 is arranged to be rotated by a predetermined angle around the x-axis. In the figure, a clockwise rotation angle is defined as a plus (positive), and a counterclockwise rotation angle is defined as a minus (negative). In the illustrated example, the rotation angle in the x-axis direction is set to a negative value. In this way, by tilting and arranging the liquid crystal element 15 so as to be non-orthogonal and non-parallel to the optical axis of the projection lens 18, the light propagation direction obliquely intersects the liquid crystal layer 59 of the liquid crystal element 15. In other words, the liquid crystal element 15 is arranged so that the optical axis of the projection lens 18 and the layer thickness direction of the liquid crystal layer 59 form an angle greater than 0° and smaller than 90°. Here, although not shown, the liquid crystal element 15 can be similarly arranged at a position rotated by a predetermined angle around the y-axis. Further, as shown in FIG. 4C, the liquid crystal element 15 can be arranged at a position rotated by a predetermined angle around both the x-axis and the y-axis.

Figure 5A:
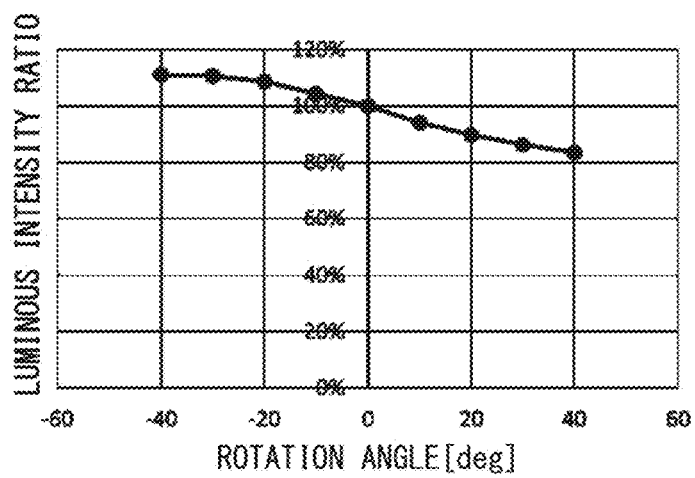
FIG. 5A to FIG. 5C are diagrams showing measurement examples of the relative luminous intensity at the center part of the projected image 10 m ahead of the light emitted from the projection lens.
Figure 5B:
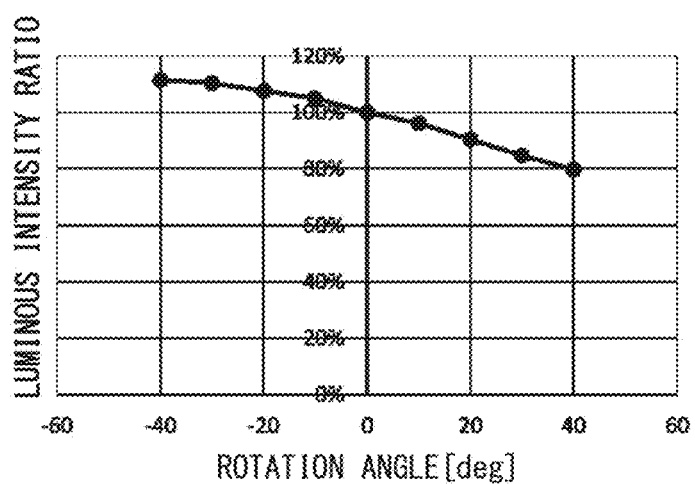
Figure 5C:
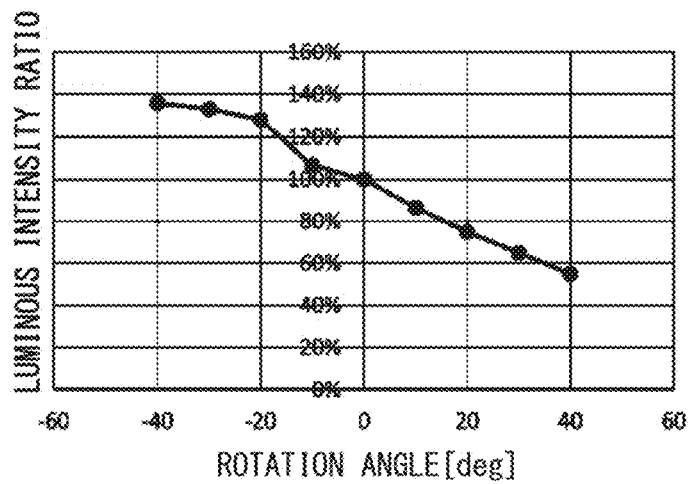

FIG. 5A to FIG. 5C are diagrams showing measurement examples of the relative luminous intensity of the projected image center part of the emitted light 10 m ahead from the projection lens. Specifically, these graphs show the result of rotation angle dependency of the luminous intensity ratio when luminous intensity of transmitted light of the base arrangement (base configuration) shown in FIG. 4A is defined as 100%. FIG. 5A shows the rotation angle dependency of the luminous intensity ratio when the liquid crystal element 15 is arranged to be rotated around the x-axis. This arrangement corresponds to when caused to rotate around the axis of 0°-180° azimuth in the above-described FIG. 3B. It can be seen that, at a rotation angle corresponding to when caused to rotate to 270° azimuth in which the transmittance increases, that is, at a rotation angle of a negative value, the luminous intensity ratio increases, and the luminous intensity ratio decreases when the rotation angle is a positive value. That is, in this measurement example, a negative rotation angle corresponds to a range of the best viewing azimuth ±90° or less, and a positive rotation angle corresponds to a range of less than the anti-viewing azimuth ±90°. Here, note that the range of rotation angle of ±40° corresponds to the approximate range of the wide incident angle of light entering the liquid crystal element 15.

FIG. 5B shows the rotation angle dependency of the luminous intensity ratio when the liquid crystal element 15 is arranged to be rotated around the y-axis. This arrangement corresponds to when caused to rotate around the axis of 90°-270° azimuth of the above-described FIG. 3B. It can be seen that, at a rotation angle corresponding to when caused to rotate to 180° azimuth in which the transmittance increases, that is, at a rotation angle of a negative value, the luminous intensity ratio increases, and the luminous intensity ratio decreases when the rotation angle is a positive value. That is, in this measurement example, a negative rotation angle corresponds to a range of the best viewing azimuth ±90° or less, and a positive rotation angle corresponds to a range of less than the anti-viewing azimuth ±90°.

FIG. 5C shows the rotation angle dependency of the luminous intensity ratio when the liquid crystal element 15 is arranged to be rotated around the x-axis and the y-axis. This arrangement corresponds to when caused to rotate around the axis of 135°-315° azimuth of the above-described FIG. 3B. It can be seen that, at a rotation angle corresponding to when caused to rotate to 225° azimuth in which the transmittance increases, that is, at a rotation angle of a negative value, the luminous intensity ratio increases. and the luminous intensity ratio decreases when the rotation angle is a positive value. That is, in this measurement example, a negative rotation angle corresponds to a range of the best viewing azimuth ±90° or less, and a positive rotation angle corresponds to a range of less than the anti-viewing azimuth ±90°. Further, the luminous intensity ratio increases more than when rotated around only the x-axis or only the y-axis.

In this way, by arranging the liquid crystal element 15 so as to be tilted such that the light propagation direction (optical axis L of the projection lens 18) obliquely intersects the liquid crystal layer 59, it is possible to increase the luminous intensity ratio. That is, the luminous intensity (brightness) of the irradiation light emitted from the vehicle lamp 1 can be improved. However, when the liquid crystal element 15 itself is tilted, the layer thickness of the liquid crystal layer 59 in the light propagation direction increases. When the liquid crystal layer thickness is defined as "d" and the tilt angle of the liquid crystal element 15 is is defined as "θ", the substantial liquid crystal layer thickness when the liquid crystal element 15 is tilted becomes "d/cos θ", but by disposing an optical compensator having negative uniaxial optical anisotropy between the liquid crystal element 15 and the polarizing beam splitter 12 or between the liquid crystal element 15 and the polarizer 17, it is possible to optically compensate for an increase in retardation due to a substantial increase of the liquid crystal layer thickness. However, if the wavelength distributions of the refractive indexes of the liquid crystal layer and the optical compensator do not match, then a complete optical compensation cannot be achieved over the entire visible wavelength range, and light leakage may occur. Further, since the polarizer 17 on the emitting side of the liquid crystal element 15 is tilted relative to the liquid crystal element 15, light leakage may occur due to a shift in the absorption axis.

Figure 6:
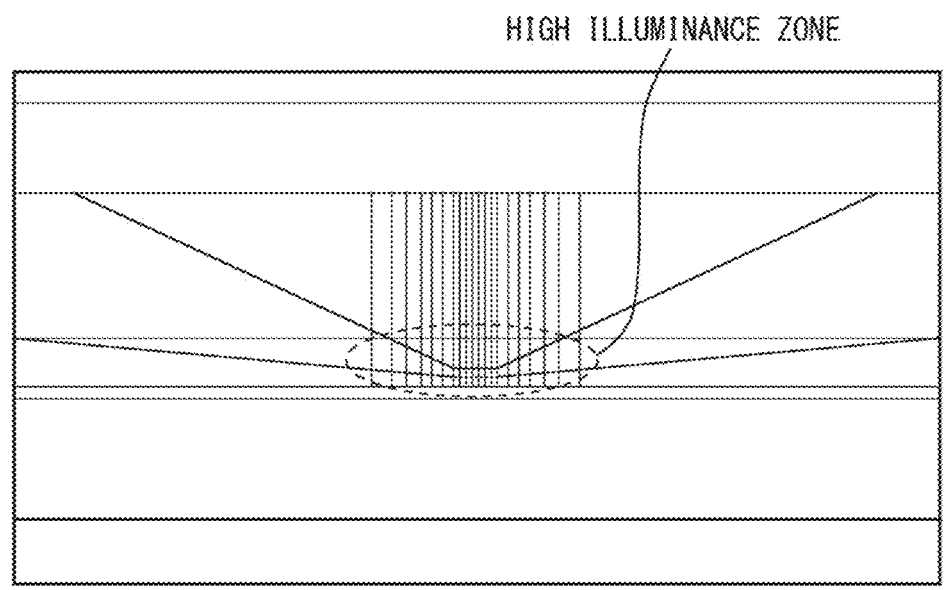
FIG. 6 is a diagram illustrating a plane view structure of a liquid crystal element.

FIG. 6 illustrates a plane view structure of the liquid crystal element 15. In the illustrated liquid crystal element 15, it can be said that it is preferable that the liquid crystal element 15 is arranged so that the light propagation direction is caused to become the normal direction of the incident surface/emitting surface of the liquid crystal element 15, especially in a "high illuminance zone" where luminous intensity of the projection light near the center is high. This high illuminance zone is a portion that contributes to light distribution near a center position of the front of the vehicle, for example, and this position is the portion where light is focused and collected. On the other hand, if the projection light becomes a spot light in attempt to increase the luminous intensity of the high illuminance zone, in order to increase the luminous intensity at a position away from the center part, by causing the light propagation direction (optical axis L of the projection lens 18) to tilt instead of causing it to become normal to the direction of the incident surface/emitting surface of the liquid crystal element 15, it is considered possible to suppress light leakage in the high illuminance zone, increase luminous intensity in a wide region other than the high illuminance zone, and improve light utilization efficiency. Hereinafter, based on such knowledge, a configuration example of the liquid crystal element 15 applicable to the vehicle lamp 1 will be described. Here, in the following description, in order to distinguish each configuration example, the symbols attached to the liquid crystal elements will be appropriately referred to as 15a, 15b, 15c, and 15d. All of these are configuration examples that can be applied as the liquid crystal element 15 in the vehicle lamp 1 described above.

Figure 7A:
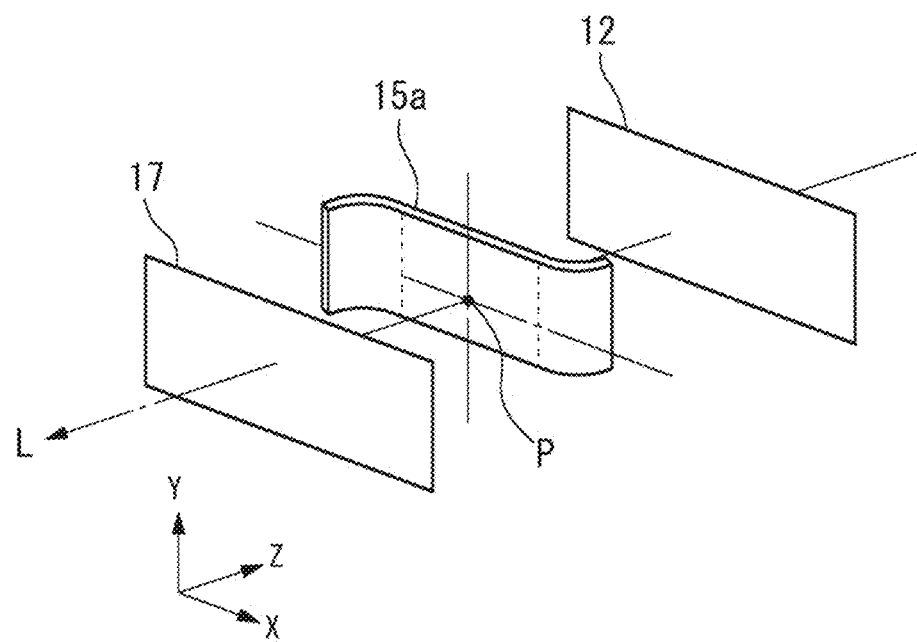
FIG. 7A and FIG. 7B are schematic perspective views showing configuration examples of a liquid crystal element applicable to a vehicle lamp.
Figure 7B:
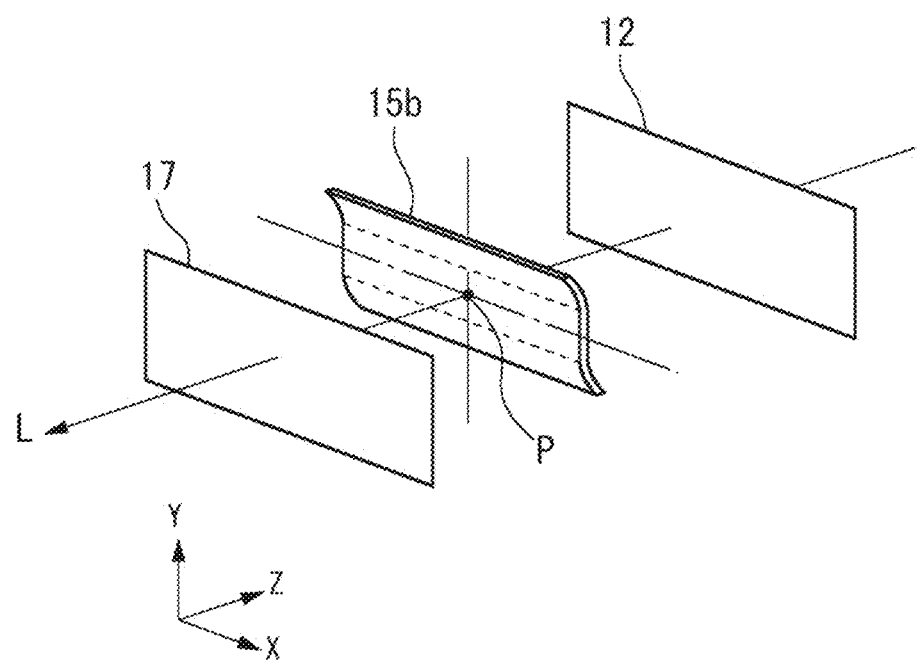

FIG. 7A and FIG. 7B are schematic perspective views showing configuration examples of a liquid crystal element applicable to a vehicle lamp. The liquid crystal element 15a of the configuration example shown in FIG. 7A is arranged at a position "P" intersecting the optical axis L and in association with the above-described high illuminance zone.

In a certain range including this position "P" (a first surface), the optical axis L of the projection lens 18 and the incident surface/emitting surface of the liquid crystal element 15a are configured to be substantially perpendicular to each other. Further, in the X direction in the figure, the liquid crystal element 15a is curved outside of the certain range including the position "P" (a second surface). Such a curved liquid crystal element 15a can be realized by using resin substrates as the first substrate 51 and the second substrate 52, or by using thin glass substrates, for example.

Figure 8:
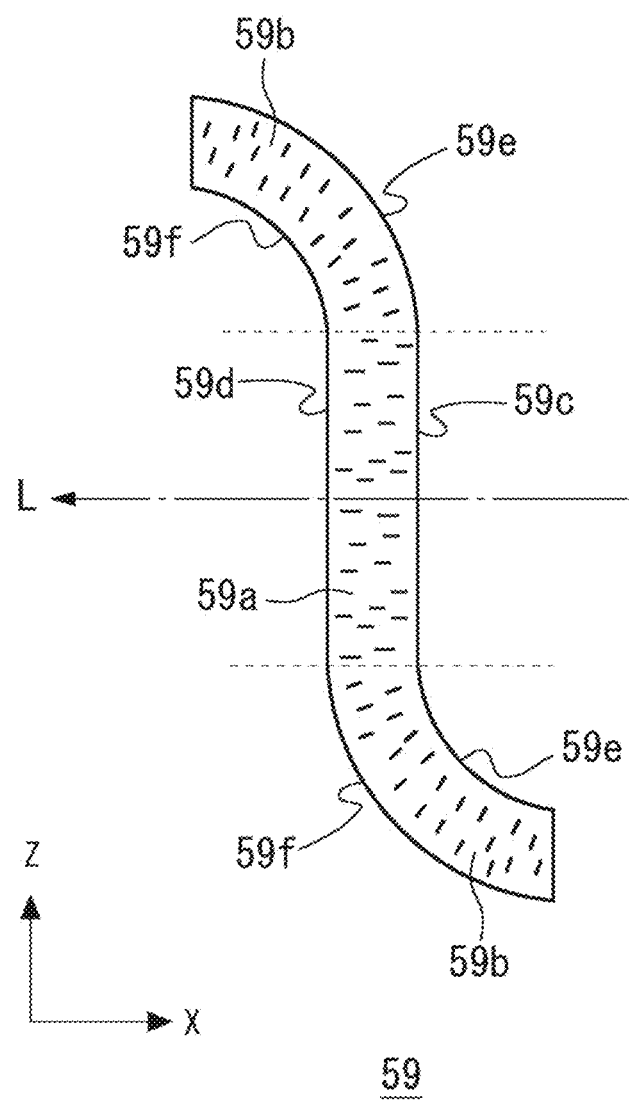
FIG. 8 is a schematic cross-sectional view showing the structure of the liquid crystal layer in the liquid crystal element of the configuration example shown in FIG. 7A.

FIG. 8 is a schematic cross-sectional view showing the structure of the liquid crystal layer in the liquid crystal element of the configuration example shown in FIG. 7A. FIG. 8 corresponds to a cross section viewed from the Y direction shown in FIG. 7A. As shown in the figure, the liquid crystal layer 59 of the liquid crystal element 15a has a shape that follows the shapes of the first substrate 51 and the second substrate 52, which are arranged facing each other with the liquid crystal layer 59 in between. Specifically, the liquid crystal layer 59 has a flat first portion 59a configured in a flat plate shape and two curved second portions 59b arranged on both sides thereof. In this liquid crystal element 15a, the light incident side surface 59c and the light emitting side surface 59d of the first portion 59a are substantially perpendicular to the optical axis L of the projection lens 18, and a light incident side surface 59e and a light emitting side surface 59f of each second portion 59b are arranged in a direction oblique to the optical axis L of the projection lens 18.

In this liquid crystal element 15a, it can be said that, at least the light incident side interface 59c of the first portion 59a corresponds to the above-described first surface, and at least the light incident side interface 59e of each second portion 59b corresponds to the above-described second surface. In other words, in the liquid crystal element 15a, the surfaces of the portions which are not in contact with the liquid crystal layer 59 and in which the first substrate 51 or the second substrate 52 and the first portion 59a overlap can also be considered to correspond to the first surface, and the surfaces of the portions which are not in contact with the liquid crystal layer 59 and in which the first substrate 51 or the second substrate 52 and each of the second portion 59b overlap can also be considered to correspond to the second surface. By arranging in this way, light can be incident on the second portion 59b of the liquid crystal element 15a from the best viewing azimuth or from within a range of ±90° or less on the basis of the best viewing azimuth.

Here, note that although illustration and detailed description are omitted, the liquid crystal element of the configuration example shown in FIG. 7B also has a similar liquid crystal layer structure.

In the configuration example shown in FIG. 7A, the left end side (in the figure) of the liquid crystal element 15a is curved so as to approach the polarizer 17 in the Z direction, and the right end side (in the figure) of the liquid crystal element 15a is curved so as to approach the polarizing beam splitter 12 in the Z direction. That is, the liquid crystal element 15 is flat in a certain range including the position "P", and both sides of the liquid crystal element 15 are curved in symmetrical directions with the certain range in between. The liquid crystal element 15b of the configuration example shown in FIG. 7B is similar to this, and the only difference is that the direction of the curve is changed to the Y direction in the figure.

By using these liquid crystal elements 15a and 15b, the light propagation direction can be tilted with respect to the incident surface/emitting surface at both ends of the liquid crystal elements 15a and 15b, so that the transmittance can be increased. Here, in addition to causing to curve both sides of the liquid crystal element 15a in the X direction or both sides of the liquid crystal element 15b in the Y direction as shown in the figures, the liquid crystal element itself may be caused to bend so as to be tilted at a certain angle. When caused to curve, by increasing the inclination angle as the distance from the position "P" of the center part increases, it is considered that a wider projection light can be obtained, and it is considered possible to suppress glare of the center part at the same time. Here, although the illustrated examples have shown the structure of the liquid crystal element curved in the X direction or the Y direction, it may be structured so that it is curved or bent in both the X direction and the Y direction.

Figure 9A:
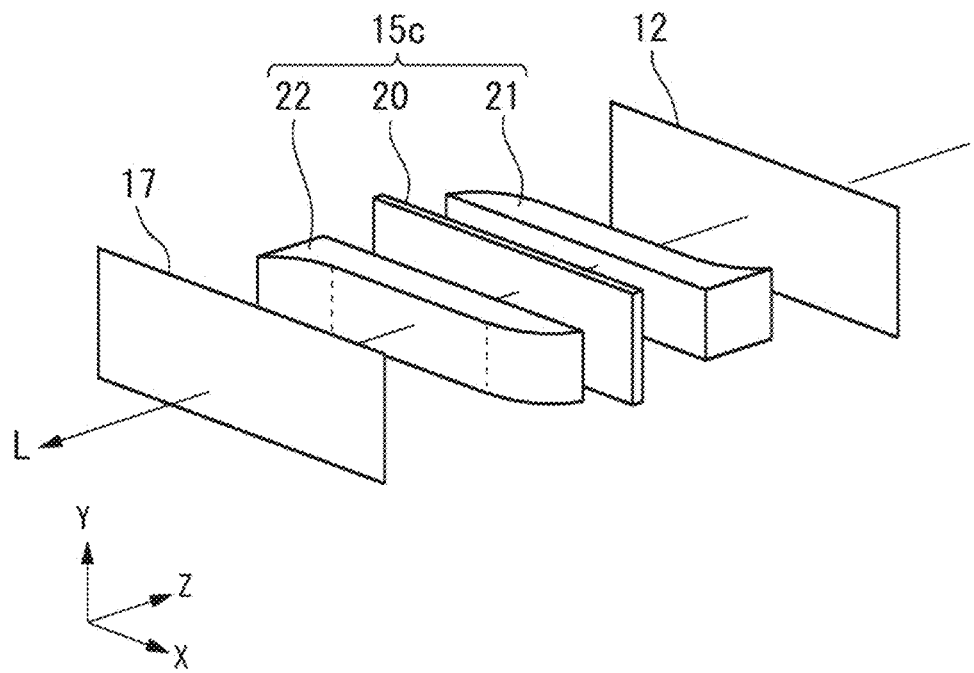
FIG. 9A and FIG. 9B are schematic perspective views showing configuration examples of a liquid crystal element applicable to a vehicle lamp.

FIG. 9A is a schematic perspective view showing a configuration example of a liquid crystal element applicable to a vehicle lamp. The liquid crystal element 15c of the configuration example shown in FIG. 9A includes a liquid crystal panel part 20 configured in a flat plate shape and having a flat liquid crystal layer 59, a first prism 21 disposed between the liquid crystal panel part 20 and the polarizing beam splitter 12, and a second prism 22 disposed between the liquid crystal panel part 20 and the polarizer 17. The configuration of the liquid crystal panel part 20 is similar to the liquid crystal element 15 shown in FIG. 2A described above. By using such first prism 21 and second prism 22, it is possible to achieve the same function as when the liquid crystal element itself is curved or bent. That is, by utilizing the light refraction effect of the first prism 21 and the second prism 22, the light incident to the liquid crystal layer 59 of the liquid crystal panel part 20 and the light emitting from the liquid crystal layer 59 can be made similar to when the liquid crystal element 15a shown in FIG. 7A is used. Here, note that the term "prism" in this specification refers to an optical element that can at least have an effect of refracting light.

In the illustrated example, to facilitate easier understanding of the configuration, the first prism 21 and the second prism 22 are shown separated from the liquid crystal panel part 20, but it is preferable that the first prism 21 and the second prism 22 are respectively arranged in close contact with the liquid crystal panel part 20. Further, in that case, it is preferable that an optical matching adhesive be provided between each of the first prism 21 and the second prism 22 and the liquid crystal panel part 20 to achieve bonding. Thereby, optical loss at the interface can be suppressed.

The first prism 21 has one flat surface on the side facing the liquid crystal panel part 20 and has a partially curved and an inclined other surface on the side not facing the liquid crystal panel part 20. The shape of the inclined other surface of the first prism 21 can be similar to when the liquid crystal element 15a itself is curved as shown in FIG. 7A. In detail, the other surface of the first prism 21 has, a flat first surface that is substantially perpendicular to the optical axis L of the projection lens 18 in a certain range including a position intersecting the optical axis L of the projection lens 18, and outside the certain range in the X direction in the figure, has a second surface that is curved (on the right side of the figure) so as to gradually approach the polarizing beam splitter 12 and is curved and inclined (on the left side in the figure) so as to gradually move away from the polarizing beam splitter 12.

Similarly, the second prism 22 has one flat surface on the side facing the liquid crystal panel part 20 and has a partially curved and inclined other surface on the side not facing the liquid crystal panel part 20. The shape of the inclined other surface of the second prism 22 can be similar to when the liquid crystal element 15a itself is curved as shown in FIG. 7A. In detail, the other surface of the second prism 22 has, a flat first surface that is substantially perpendicular to the optical axis L of the projection lens 18 in a certain range including a position intersecting the optical axis L of the projection lens 18, and outside the certain range in the X direction in the figure, has a second surface that is curved (on the left side of the figure) so as to gradually approach the polarizer 17 and is curved and inclined (on the right side in the figure) so as to gradually move away from polarizer 17.

Here, note that although each other surface of the first prism 21 and the second prism 22 curves in one direction in the illustrated example, it is also possible to curve each other surface in two directions. The material of each of the first prism 21 and the second prism 22 can be glass, quartz, acrylic resin or the like, for example.

Figure 9B:
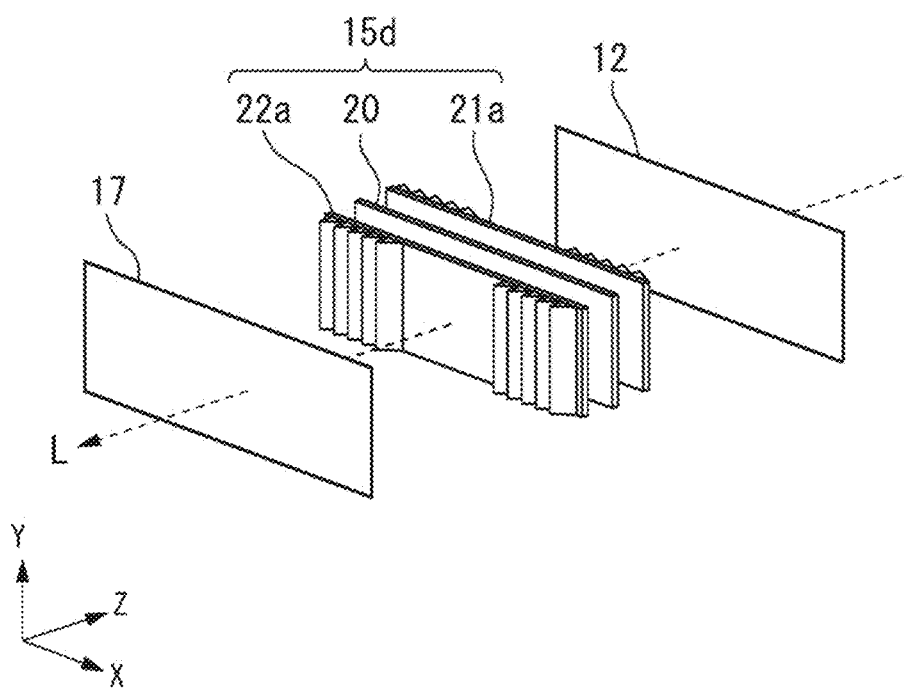

FIG. 9B is a schematic perspective view showing a configuration example of a liquid crystal element applicable to a vehicle lamp. The liquid crystal element 15d of the configuration example shown in FIG. 9B includes a liquid crystal panel part 20 configured in a flat plate shape and having a flat liquid crystal layer 59, a first flat prism 21a disposed between the liquid crystal panel part 20 and the polarizing beam splitter 12, and a second flat prism 22a disposed between the liquid crystal panel part 20 and the polarizer 17. The configuration of the liquid crystal panel part 20 is similar to the liquid crystal element 15 shown in FIG. 2A described above. By using such first flat prism 21a and second flat prism 22a, it is possible to achieve a similar function as when the liquid crystal element itself is curved. That is, the light incident to the liquid crystal layer of the liquid crystal panel part 20 and the light emitting from the liquid crystal layer can be made similar to when the liquid crystal element 15a shown in FIG. 7A is used. Further, the first flat prism 21a and the second flat prism 22a are flat prisms configured in the shape of a Fresnel lens, and compared to the first prism 21 and the second prism 22 shown in FIG. 9A, the optical system including the liquid crystal element 15d can be made more compact.

The first flat prism 21a has one flat surface on the side facing the liquid crystal panel part 20 and has a partially curved and inclined other surface on the side not facing the liquid crystal panel part 20. The other surface of the first flat prism 21a has, a flat first surface that is substantially perpendicular to the optical axis L of the projection lens 18 in a certain range including a position intersecting the optical axis L of the projection lens 18, and outside the certain range in the X direction in the figure, has a second surface that is an uneven surface with a serrated cross section.

The second flat prism 22a has one flat surface on the side facing the liquid crystal panel part 20 and has a partially curved and inclined other surface on the side not facing the liquid crystal panel part 20. The other surface of the second flat prism 22a has a flat first surface that is substantially perpendicular to the optical axis L of the projection lens 18 in a certain range including a position intersecting the optical axis L of the projection lens 18, and outside the certain range in the X direction in the figure, has a second surface that is an uneven surface with a serrated cross section.

In the illustrated example, to facilitate easier understanding of the configuration, the first flat prism 21a and the second flat prism 22a are shown separated from the liquid crystal panel part 20, but it is preferable that the first flat prism 21a and the second flat prism 22a are respectively arranged in close contact with the liquid crystal panel part 20. Further, in that case, it is preferable that an optical matching adhesive be provided between each of the first flat prism 21a and the second flat prism 22a and the liquid crystal panel part 20 to achieve bonding. Thereby, optical loss at the interface can be suppressed.

The first flat prism 21a shown in FIG. 9B has a surface similar to the second surface of the other surface of the first prism 21 (shown in FIG. 9A described above) divided into a plurality of regions to configure like a Fresnel lens, and has a serrated fine uneven structure on both sides in the X direction. In the first flat prism 21a, the inclination angle of the surface facing the polarizing beam splitter 12 of each fine prism forming the uneven structure has an angular distribution that is capable of simulatedly reproducing the second surface of the first prism 21 shown in FIG. 9A described above. Here, the phrase "capable of simulatedly reproducing" means that, if the surfaces formed by the serrated uneven structure were caused to join together, the same surface as the second surface of the first prism 21 shown in FIG. 9A can be obtained, and an optically equivalent function can be obtained. The inclination angle of the uneven surface increases as it approaches both ends in the X direction.

Similarly, the second flat prism 22a has a surface similar to the second surface of the other surface of the second prism 22 (shown in FIG. 9A described above) divided into a plurality of regions to configure like a Fresnel lens, and has a serrated fine uneven structure on both sides in the X direction. In the second flat prism 22, the inclination angle of the surface facing the polarizer 17 of each fine prism forming the uneven structure has an angular distribution that is capable of simulatedly reproducing the second surface of the second prism 22a shown in FIG. 9A described above. Here, the phrase "capable of simulatedly reproducing" means that, if the surfaces formed by the serrated uneven structure were caused to join together, the same surface as the second surface of the second prism 22 shown in FIG. 9A can be obtained, and an optically equivalent function can be obtained. The inclination angle of the uneven surface increases as it approaches both ends in the X direction.

Here, note that although each other surface of the first flat prism 21a and the second flat prism 22a curves in one direction in the illustrated example, it is also possible to curve each other surface in two directions. The material of each of the first flat prism 21a and the second flat prism 22a can be glass, quartz, acrylic resin or the like, for example. Further, it may be metal molded using an ultraviolet-effect resin or the like on a flat glass substrate.

According to each of the embodiments described above, it is possible to improve the brightness of irradiation light in a lighting apparatus or the like that uses a liquid crystal element.

Here, the present disclosure is not limited to the content of the embodiments described above, and can be implemented with various modifications within the scope of the gist of the present disclosure. For example, in the above-described embodiments, a vehicle lamp is cited as an example of a lighting apparatus, but the scope of application of the present disclosure is not limited thereto. For example, the configuration according to the present disclosure can be applied to various lighting apparatus such as street lights, railroad crossing lighting apparatus, and direction guide lighting apparatus. Further, the optical system of the vehicle lamp is not limited to the configuration of the embodiments described above. Further, the structure of the liquid crystal element is not limited to the structure of the above-described embodiments. Furthermore, in the embodiments described above (the embodiments shown in FIG. [8A] 9A and FIG. 9B), the first prism 21 or the first flat prism 21a are arranged between the liquid crystal panel part 20 and the polarizing beam splitter 12, but the positions of the polarizing beam splitter 12 and the first prism 21 or the first flat prism 21a may be exchanged. That is, the polarizing beam splitter 12 may be arranged between the first prism 21 or the first flat prism 21a and the liquid crystal panel part 20. Similarly, the positions of the polarizer 17 and the second prism 22 or the second flat prism 22a may be exchanged, and the polarizer 17 may be arranged between the second prism 22 or the second flat prism 22a and the liquid crystal panel part 20 as well.

REFERENCE SIGNS LIST

1: Vehicle lamp
2: Controller
3: Camera
10: Light source
11, 13: Reflector
12: Polarizing beam splitter
14: ½-wavelength plate
15, 15a, 15b, 15c, 15d: Liquid crystal element
16: Optical compensator
17: Polarizer
18: Projection lens
20: Liquid crystal panel part
21: First prism
21a: First flat prism
22: Second prism
22a: Second flat prism
51: First substrate
52: Second substrate
53: Wiring
54: Common electrode (Counter electrode)
55: Insulation layer (Insulation film)
56: Pixel electrode
57, 58: Alignment film
59: Liquid crystal layer

The invention claimed is:

1. A lighting apparatus comprising:
a light source;
a condensing part that condenses light emitted from the light source so as to form a focal point at a predetermined position;
a liquid crystal element having a liquid crystal layer and arranged at a position including the focal point;
a first polarizing element disposed on a light incident surface side of the liquid crystal element;
a second polarizing element disposed on a light emitting surface side of the liquid crystal element; and
a projection lens that magnifies and projects images generated by the liquid crystal element, the first polarizing element, and the second polarizing element;
wherein the liquid crystal element has a first surface that includes the position of the focal point and is substantially perpendicular to the optical axis of the projection lens, and at least one second surface disposed around the first surface and arranged in a direction oblique to the optical axis of the projection lens; and
wherein the second surface is arranged such that the light is incident on the liquid crystal layer of the liquid crystal element from a best viewing azimuth of the liquid crystal element or from an azimuth within a range of ±90° or less in the azimuth angle direction based on the best viewing azimuth.

2. The lighting apparatus according to claim 1,
wherein the liquid crystal element is configured by arranging the liquid crystal layer between substrates arranged opposite to each other,
wherein the liquid crystal layer has a flat first portion and a bent or curved second portion,
wherein the first surface is provided at the first portion, and
wherein the second surface is provided at the second portion.

3. The lighting apparatus according to claim 1,
wherein the liquid crystal element includes: a flat plate shape liquid crystal panel part including the liquid crystal layer configured in a flat plate shape disposed between opposing substrates; a first prism disposed between the liquid crystal panel part and the first polarizing element; and a second prism disposed between the liquid crystal panel part and the second polarizing element;
wherein the first prism is provided with the first surface and the second surface on a side facing the first polarizing element, and
wherein the second prism is provided with the first surface and the second surface on a side facing the second polarizing element.

4. The lighting apparatus according to claim 1,
wherein the liquid crystal element includes: a flat plate shape liquid crystal panel part including the liquid crystal layer configured in a flat plate shape disposed between opposing substrates; a first flat prism disposed between the liquid crystal panel part and the first polarizing element; and a second flat prism disposed between the liquid crystal panel part and the second polarizing element;
wherein the first flat prism is provided with the first surface and the second surface on a side facing the first polarizing element,
wherein the second flat prism is provided with the first surface and the second surface on a side facing the second polarizing element, and
wherein the second surface of the first flat prism and the second surface of the second flat prism are each simulatedly configured by an uneven structure with a serrated cross section.

5. The lighting apparatus according to claim 4,
wherein, if the surface of the uneven structure with a serrated cross section that faces the first polarizing element were caused to join together, then the second surface of the first flat prism is reproduced, and an optically equivalent function can be obtained, and
wherein, if the surface of the uneven structure with a serrated cross section that faces the second polarizing element were caused to join together, then the second surface of the second flat prism is reproduced, and an optically equivalent function can be obtained.

6. The lighting apparatus according to claim 1,
wherein the first polarizing element and/or the second polarizing element is a transmission-reflection type polarizer or an optical multilayer film polarizer having a wire grid.

7. The lighting apparatus according to claim 1
wherein the liquid crystal element is a monodomain vertically aligned liquid crystal element.

8. A vehicle lamp system comprising the lighting apparatus according to claim 1 and a controller connected to the lighting apparatus to control its operation.

\* \* \* \* \*